US010109217B2

(12) United States Patent
Tseng

(10) Patent No.: US 10,109,217 B2
(45) Date of Patent: Oct. 23, 2018

(54) SPEECH ASSESSMENT DEVICE AND METHOD FOR A MULTISYLLABIC-WORD LEARNING MACHINE, AND A METHOD FOR VISUALIZING CONTINUOUS AUDIO

(71) Applicants: Ya-Mei Tseng, Taipei (TW); CAPICLOUD TECHNOLOGY LIMITED, New Taipei (TW)

(72) Inventor: Ya-Mei Tseng, Taipei (TW)

(73) Assignees: Ya-Mei Tseng (TW); CAPICLOUD TECHNOLOGY LIMITED, Indianapolis (*) Notice: Subject to any disclaimer, the term of this patent is extended or adjusted under 35 U.S.C. 154(b) by 219 days.

(21) Appl. No.: 15/081,925

(22) Filed: Mar. 27, 2016

(65) Prior Publication Data
US 2017/0278424 A1  Sep. 28, 2017

(51) Int. Cl.
A63F 9/24 (2006.01)
G09B 19/04 (2006.01)
G10L 21/10 (2013.01)
G09B 5/06 (2006.01)
G10L 21/06 (2013.01)

(52) U.S. Cl.
CPC ............ G09B 19/04 (2013.01); G09B 5/06 (2013.01); G10L 21/10 (2013.01); G10L 2021/065 (2013.01)

(58) Field of Classification Search
CPC .................. G09B 19/06; G09B 19/04
See application file for complete search history.

(56) References Cited

U.S. PATENT DOCUMENTS 8,602,789 B2 * 12/2013 Hallowell ............... G09B 7/00
434/167
2012/0065977 A1 * 3/2012 Tepperman ............. G10L 13/08
704/258
2014/0278786 A1 * 9/2014 Liu-Qiu-Yan ...... G06Q 30/0201
705/7.32

* cited by examiner

Primary Examiner — Steve Rowland
(74) Attorney, Agent, or Firm — Bruce Stone LLP; Joseph Bruce

(57) ABSTRACT

A speech assessment device and method for a multisyllabic-word learning machine, and a method for visualizing continuous audio are provided. By performing the step of starting the assessment mode, the step of selecting words to be assessed, the step of choosing to play or record, the step of recording, the step of visualization (including the step of picking out fundamental frequency, the step of defining analysis point, the step of transforming polygonal lines, and the step of simplifying the polygonal lines), the step of repeating, and the step of assessment, the speech assessment device and method for a multisyllabic-word learning machine are capable of providing assistance in oral language learning, and capable of rehabilitating patients with hearing impairment through visual aids.

20 Claims, 13 Drawing Sheets

SPEECH ASSESSMENT DEVICE AND METHOD FOR A MULTISYLLABIC-WORD LEARNING MACHINE, AND A METHOD FOR VISUALIZING CONTINUOUS AUDIO

BACKGROUND

Field of the Invention

The present invention relates to a speech reorganization device, and more particularly to a speech assessment device and method for a multisyllabic-word learning machine, and a method for visualizing continuous audio.

Related Prior Art

Thanks for the rapid development of medical science in today's society, many hearing impaired adults or children in rehabilitation mostly resort to hearing aids or implanted electronic ear to restore their hearing. However, with the aid of the hearing aids, the patients' perception of the unique frequency of Chinese tone is sometimes insufficient. Therefore, a speech rehabilitation device which can be used in combination with hearing or visual aids is badly needed.

People with hearing impairment have much difficulty in learning the pronunciation of monosyllabic word, and more particularly in learning and rehabilitation of consecutive spoken words. Hence, it necessary to develop a rehabilitation device which is suitable for learning and rehabilitation of consecutive spoken words.

Besides, mandarin is very popular nowadays, and more and more non-Chinese speakers are learning mandarin. However, however language learning is not a sprint, and often requires the use of many auxiliary learning tools to enhance the effect of learning. What's more, language learning can be divided into listening, speaking, reading and writing, among them, the most widely applied is speaking. Therefore, in addition to hearing input, a device which is capable of providing assistance in oral language learning by visual aids is also necessary. When speech learning and evaluation of speech learning achievements are considered, the language learning devices and the software interfaces commonly available on the market are mostly designed based on isolated characters, therefore, there is still a gap between the language learning based on isolated characters and the actual spoken communication which is mainly based on words, due to the fact that a person normally speaks word by word in a consecutive way, rather than character by character with pauses between saying isolated characters. A language learning device stored with isolated characters operates on single characters at a time in an inconsecutive way, requiring a pause between saying each character, which is called mechanical speech. No matter how the characters of the mechanical speech are assembled, adjusted or beautified, they just don't sound like a real person. Therefore, the continuous speech learning method has found no application in various language learning or assessment devices, or even in the speech recognition system.

The application of most of the speech recognition technologies available on the market is limited to various voice control devices, access control system and wireless communication devices, which mostly operate on isolated characters, and lack the functions of Chinese tone assessment, and comparison by continuous speech in which characters or words are connected together, not separated by pauses.

The present invention has arisen to mitigate and/or obviate the afore-described disadvantages.

SUMMARY

The present invention is aimed at providing a speech assessment device for a multisyllabic-word learning machine.

The present invention is further aimed at providing a speech assessment method for a multisyllabic-word learning machine, and method for visualizing the continuous audio file.

Therefore, a speech assessment device for a multisyllabic-word learning machine, in accordance with the present invention comprises:

a standard speech database including at least one standard audio file for characters or words, and a reference polygonal line corresponding to the standard audio file for characters or words, the standard audio file for characters or words including a standard continuous audio file for multisyllabic words, wherein the standard continuous audio file for multisyllabic words includes a standard continuous audio file in which each of the multisyllabic words is spoken continuously without pause, and a standard audio file in which the multisyllabic words is spoken character by character with pauses between saying isolated characters, the standard continuous audio file for multisyllabic words includes a monosyllabic reference polygonal line for each separate character, and the monosyllabic reference polygonal lines for each separate character are combined into a continuous multisyllabic reference polygonal line for multisyllabic words;

a speech playing unit serving to play the standard audio files for the words stored in the standard speech database;

a central processing system including a central processing unit which is connected to the standard speech database and the speech playing unit, the central processing unit being signal connected to a playing interface, an audio visualization unit, and a displaying unit, the central processing unit being further connected to a speech receiving unit, a learner's speech database, and an assessment unit, wherein the central processing unit makes comparison and assessment of the standard speech database through the assessment unit, the playing interface allows a user to select pronunciation or audio files for words from the standard speech database or the learner's speech database, and then the playing interface controls the speech playing unit to play the selected audio files, the audio visualization unit converts the audio files for words spoken by a learner into a learner's polygonal line, while controlling the speech playing unit to play the selected audio files from the standard speech database or the learner's speech database, the playing interface also shows the corresponding reference polygonal line and the learner's polygonal line from the standard speech database or the learner's speech database, simultaneously;

the speech receiving unit serving to receive speech spoken by the user or learner, and the received speech becomes the learner's audio file in the learner's speech database, wherein the received speech is transmitted to and converted by the audio visualization unit into the learner's polygonal line; and the learner's speech database including at least one learner's audio file and a learner's polygonal line corresponding to the learner's audio file, the learner's audio file including a learner's continuous audio file for multisyllabic words, wherein the learner's continuous audio file for multisyllabic words includes a learner's continuous audio file in which each of the multisyllabic words is spoken by the learner continuously without pause, and a learner's audio file in which the multisyllabic words is spoken by the learner character by character with pauses between saying isolated characters, the learner's continuous audio file for multisyllabic words includes a learner's monosyllabic reference polygonal line for each separate character, and the learner's monosyllabic reference polygonal lines for each separate character are combined into a learner's continuous multi-syllabic reference polygonal line for multisyllabic words;

the assessment unit being signal connected to the central processing system, and conducts assessment by checking the slope, turning time and slope deviation of the reference polygonal line and the learner's polygonal line;

wherein the user uses the playing interface of the central processing system to select standard audio files for words to be learned, the speech playing unit plays the standard audio files for words to be learned, then the displaying unit displays a corresponding reference polygonal line, then the audio visualization unit converts the audio files for words spoken by the learner and received by the speech receiving unit into the learner's polygonal line, then the assessment unit conducts assessment by comparing the learner's polygonal line with the reference polygonal line, and produces an assessment result which is to be displayed on the displaying unit.

A speech assessment method for a multisyllabic-word learning machine, in accordance with the present invention comprises:

a step of starting the assessment mode including using the central processing system to let the displaying unit displays the playing interface;

a step of selecting words to be assessed including using the playing interface to select the standard continuous audio files for multisyllabic words, or the standard audio files for each separate character of the multisyllabic words from the standard speech database;

a step of choosing to play or record including choosing a step of playing or a step of recording;

a step of recording including using the speech receiving unit to receive and convert the words to be assessed spoken by the learner into the learner's continuous audio files for multisyllabic words, and the learner's audio files for each separate character of the multisyllabic words, wherein the learner's continuous audio files, and the learner's audio files are stored in the learner's speech database, and also transmitted to the audio visualization unit to create the learner's monosyllabic reference polygonal line for each separate character and the learner's continuous multisyllabic reference polygonal line for multisyllabic words, by conducting a step of visualization;

the step of visualization including: a step of picking out fundamental frequency, a step of defining analysis point, a step of transforming polygonal lines, and a step of simplifying the polygonal lines, wherein the step of visualization is capable of simultaneously converting standard audio file into the reference polygonal line and converting the learner's audio file into the learner's polygonal line;

the step of picking out fundamental frequency including selecting the most stable section of the frequency of the words spoken by the learner, picking out the fundamental frequency of the stable section, and forming a learner's initial curve corresponding to the first character of the multisyllabic words spoken by the learner, wherein the horizontal and vertical axes of the graph of the learner's initial curve are defined as a time axis and a frequency axis, respectively, the step of visualization is performed character by character to form the learner's monosyllabic reference polygonal line of the learner's monosyllabic reference polygonal line for each separate character;

the step of defining analysis points including defining that the learner's initial curve includes a plurality of analysis points;

the step of transforming polygonal lines including forming at least one section of line by connecting consequently connecting the four analysis points to one another, defining the section of line as an initial comparison syllable, so that the learner's initial curve presents a line which consists of the at least one section of straight line formed by the initial comparison syllables;

the step of simplifying the polygonal lines including comparing or checking the durations of the initial comparison syllables, and the total duration of the learner's initial curve, if the duration of the first initial comparison syllable is found to be less than 30% of the total duration of the learner's initial curve, the first initial comparison syllable is considered as unrepresentative and then combined with a neighboring second initial comparison syllable to form a combined initial comparison syllable, then the combined initial comparison syllable is connected to another representative initial comparison to form a learner's monosyllabic reference polygonal line for bi-syllabic words;

a step of repeating including: repeating the step of picking out fundamental frequency, the step of defining analysis point, the step of transforming polygonal lines, and the step of simplifying the polygonal lines, so as to convert the rest characters into the learner's monosyllabic reference polygonal line for bi-syllabic words of the learner's monosyllabic reference polygonal line, and connect the learner's monosyllabic reference polygonal line to form the learner's continuous bi-syllabic reference polygonal line which is to be displayed on the displaying unit;

a step of assessment including picking up the monosyllabic reference polygonal line for each separate character, and the continuous multisyllabic reference polygonal line for multisyllabic words, and comparing them with the learner's monosyllabic reference and the learner's continuous bi-syllabic reference to form a plurality of comparison parameters, and the step of assessment include one or more comparison parameters.

A method for using the speech assessment device in accordance with the present invention to visualize a continuous audio, comprises the following steps:

a step of picking out fundamental frequency including selecting the most stable section of the frequency of the words spoken by the learner, picking out the fundamental frequency of the stable section, and forming a learner's initial curve corresponding to the first character of the multisyllabic words spoken by the learner, wherein the horizontal and vertical axes of the graph of the learner's initial curve are defined as a time axis and a frequency axis, respectively, the step of visualization is performed character by character to form the learner's monosyllabic reference polygonal line of the learner's monosyllabic reference polygonal line for each separate character;

a step of defining analysis points including defining that the learner's initial curve includes a plurality of analysis points;

a step of transforming polygonal lines including forming at least one section of line by connecting consequently connecting the four analysis points to one another, defining the section of line as an initial comparison, so that the learner's initial curve presents a line which consists of the at least one section of straight line formed by the initial comparison syllables;

a step of simplifying the polygonal lines including comparing or checking the durations of the initial comparison syllables, and the total duration of the learner's initial curve, if the duration of the first initial comparison is found to be less than 30% of the total duration of the learner's initial curve, the first initial comparison is considered as unrepresentative and then combined with a neighboring second initial comparison to form a combined initial comparison syllable, then the combined initial comparison syllable is connected to another representative initial comparison to form a learner's monosyllabic reference polygonal line for bi-syllabic words; and a step of repeating including: repeating the step of picking out fundamental frequency, the step of defining analysis point, the step of transforming polygonal lines, and the step of simplifying the polygonal lines, so as to convert the rest characters into the learner's monosyllabic reference polygonal line for bi-syllabic words of the learner's monosyllabic reference polygonal lines, and connect the learner's monosyllabic reference polygonal line to form the learner's continuous bi-syllabic reference polygonal line which is to be displayed on the displaying unit.

By performing the step of starting the assessment mode, the step of selecting words to be assessed, the step of choosing to play or record, the step of recording, the step of visualization (including the step of picking out fundamental frequency, the step of defining analysis point, the step of transforming polygonal lines, and the step of simplifying the polygonal lines), the step of repeating, and the step of assessment, the speech assessment device and method for a multisyllabic-word learning machine of the preferred embodiment of the present invention is capable of providing assistance in oral language learning, and capable of rehabilitating patients with hearing impairment through visual aids.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

FIG. 5C-1 is an illustrative view showing the learner's initial curve transforming process for the speech assessment method and a continuous audio visualization method of the present invention, this figure shows one method to combine syllables;

FIG. 5C-2 is a further illustrative view showing the learner's initial curve transforming process for the speech assessment method and a continuous audio visualization method of the present invention, this figure shows another method to combine syllables;

DETAILED DESCRIPTION

The present invention will be clearer from the following description when viewed together with the accompanying drawings, which show, for purpose of illustrations only, the preferred embodiment in accordance with the present invention.

Figure 1:
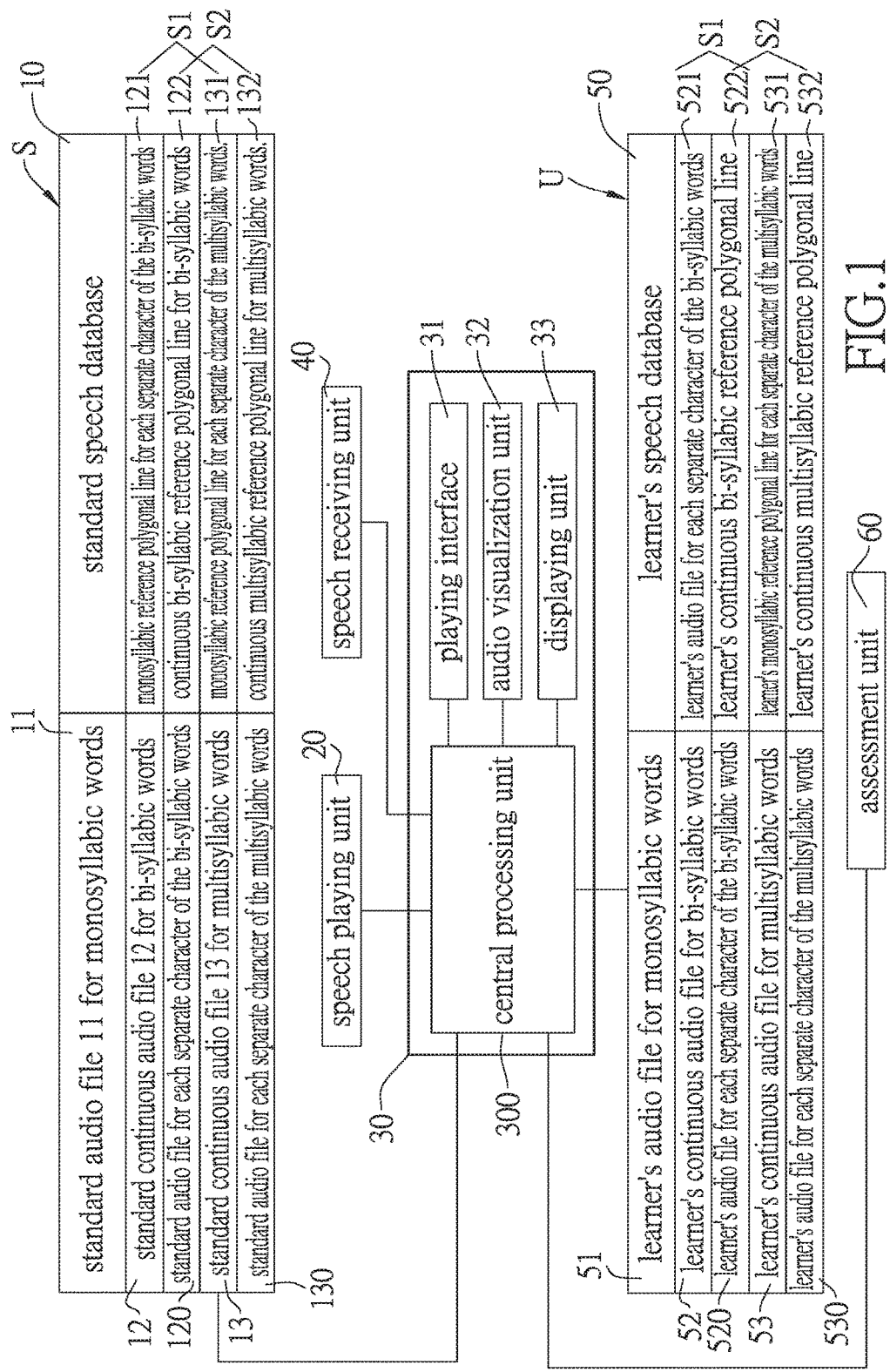
FIG. 1 is an illustrative view showing a speech assessment device for a multisyllabic-word learning machine in accordance with the preferred embodiment of the present invention.

Referring to FIG. 1, a speech assessment device for a multisyllabic-word learning machine in accordance with the preferred embodiment of the present invention, comprises: a standard speech database 10, a speech playing unit 20, a central processing system 30, a speech receiving unit 40, a learner's speech database 50, and an assessment unit 60.

The standard speech database 10 includes at least one standard audio file for characters or words, and a reference polygonal line corresponding to the standard audio file for characters or words. The standard audio file for characters or words includes: a standard audio file 11 for monosyllabic words (one-character words), a standard continuous audio file 12 for bi-syllabic words (two-character words), and a standard continuous audio file 13 for multisyllabic words (multiple-character words). Suppose that each of the standard continuous audio file 12 for bi-syllabic words, the standard continuous audio file 13 for multisyllabic words, a standard audio file 120 for each separate character of the bi-syllabic words, and a standard audio file 130 for each separate character of the multisyllabic words is a standard continuous audio file for multisyllabic words. Each of the standard audio file 11 for monosyllabic words, the standard continuous audio file 12 for bi-syllabic words, and the standard continuous audio file 13 for multisyllabic words each has a corresponding reference polygonal line S. The standard continuous audio files 12, 13, 120, and 130 for multisyllabic words each produce a monosyllabic reference polygonal line S1 for each separate character via a graph process, and the monosyllabic reference polygonal lines S1 for each separate character are combined into a continuous multisyllabic reference polygonal line S2 for multisyllabic words. The monosyllabic reference polygonal lines S1 for each separate character include: a monosyllabic reference polygonal line 121 for each separate character of the bi-syllabic words, and a monosyllabic reference polygonal line 131 for each separate character of the multisyllabic words. The continuous multisyllabic reference polygonal lines S2 for multisyllabic words include: a continuous bi-syllabic reference polygonal line 122 for bi-syllabic words and a continuous multisyllabic reference polygonal line 132 for multisyllabic words.

The speech playing unit 20 serves to play the standard audio files for the words stored in the standard speech database 10, and the speech playing unit 20 is a speaker.

The central processing system 30 includes a central processing unit 300 which is connected to the standard speech database 10 and the speech playing unit 20, and is further signal connected to a playing interface 31, an audio visualization unit 32, and a displaying unit 33. The central processing unit 300 is further connected to the speech receiving unit 40, the learner's speech database 50, and the assessment unit 60. The central processing unit 300 makes comparison and assessment of the standard speech database 10 through the assessment unit 60. The playing interface 31 allows the user to select pronunciation or audio files for words (which are to be learned or assessed) from the standard speech database 10 or the learner's speech database 50, and then the playing interface 31 controls the speech playing unit 20 to play the selected audio (pronunciation) files. The audio visualization unit 32 converts the audio files for words spoken by the learner into a learner's polygonal line U. while controlling the speech playing unit 20 to play the selected audio files from the standard speech database 10 or the learner's speech database 50, the playing interface 31 also shows the corresponding reference polygonal line S and the learner's polygonal line U from the standard speech database 10 or the learner's speech database 50, simultaneously.

The speech receiving unit 40 is a microphone to receive speech spoken by the user or learner, and the received speech becomes the learner's audio file in the learner's speech database 50. Then the received speech is transmitted to and converted by the audio visualization unit 32 into the learner's polygonal line U.

The learner's speech database 50 includes: at least one learner's audio file and a learner's polygonal line corresponding to the learner's audio file. The learner's audio file includes a learner's audio file 51 for monosyllabic words, a learner's continuous audio file 52 for bi-syllabic words, and a learner's continuous audio file 53 for multisyllabic words. Suppose that each of the learner's continuous audio file 52 for bi-syllabic words, and the learner's continuous audio file 53 for multisyllabic words, a learner's audio file 520 for each separate character of the bi-syllabic words, and a learner's audio file 530 for each separate character of the multisyllabic words is a learner's continuous audio file for multisyllabic words. Each of the learner's audio file 51 for monosyllabic words, the learner's continuous audio file 52 for bi-syllabic words, and the learner's continuous audio file 53 for multisyllabic words has a corresponding learner's polygonal line U. The learner's continuous audio file 52 for bi-syllabic words, and the learner's continuous audio file 53 for multisyllabic words each produce a learner's monosyllabic reference polygonal line U1 for each separate character via a graph process, and the learner's monosyllabic reference polygonal lines U1 for each separate character are combined into a learner's continuous multisyllabic reference polygonal line U2 for multisyllabic words. The learner's monosyllabic reference polygonal lines U1 for each separate character include: a learner's monosyllabic reference polygonal line for bi-syllabic words 521 for each separate character of the multisyllabic words, and a learner's monosyllabic reference polygonal line 531 for each separate character of the multisyllabic words. The learner's continuous multisyllabic reference polygonal lines U2 for multisyllabic words include: a learner's continuous bi-syllabic reference polygonal line 522 and a learner's continuous multisyllabic reference polygonal line 532.

The assessment unit 60 is signal connected to the central processing system 30, and conducts assessment by checking the slope, turning time and slope deviation of the reference polygonal line S and the learner's polygonal line U.

The user uses the playing interface 31 of the central processing system 30 to select standard audio files for words to be learned, the speech playing unit 20 plays the standard audio files for words to be learned, then the displaying unit 33 displays a corresponding reference polygonal line S, and then the audio visualization unit 32 converts the audio files for words spoken by the learner and received by the speech receiving unit 40 into the learner's polygonal line U. Finally, the assessment unit 60 conducts assessment by comparing the learner's polygonal line U with the reference polygonal line S, and produces an assessment result which is to be displayed on the displaying unit 33.

Referring to FIGS. 2-10, a method for using the speech assessment device for a multisyllabic-word learning machine in accordance with the preferred embodiment of the present invention, comprises a learning mode and an assessment mode.

Figure 2:
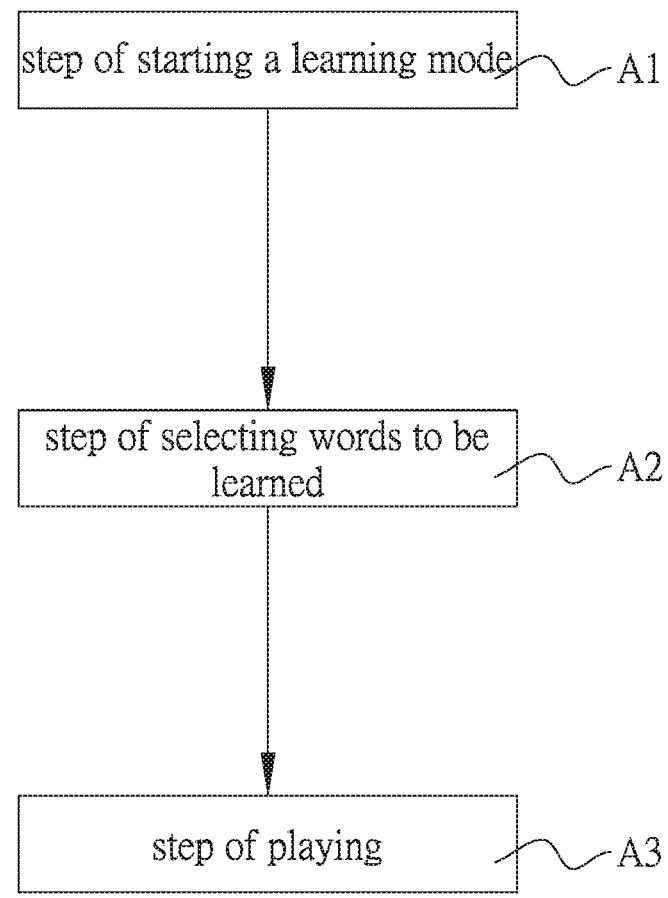
FIG. 2 is a flow chart a speech assessment method for a multisyllabic-word learning machine in accordance with a first preferred embodiment of the present invention.

The learning mode, (learning multisyllabic words for example) as shown in FIG. 2, comprises the following steps:

A step A1 of starting a learning mode includes: using the central processing system 30 to let the displaying unit 33 displays the playing interface 31.

A step A2 of selecting words to be learned includes: using the playing interface 31 to select the standard continuous audio files 12, 13 for multisyllabic words, or the standard audio files 120, 130 for each separate character of the multisyllabic words from the standard speech database 10.

A step A3 of playing includes: using the playing interface 31 to control the speech playing unit 20 to play the standard continuous audio files 12, 13 for multisyllabic words, or the standard audio files 120, 130 for each separate character of the multisyllabic words.

Figure 3:
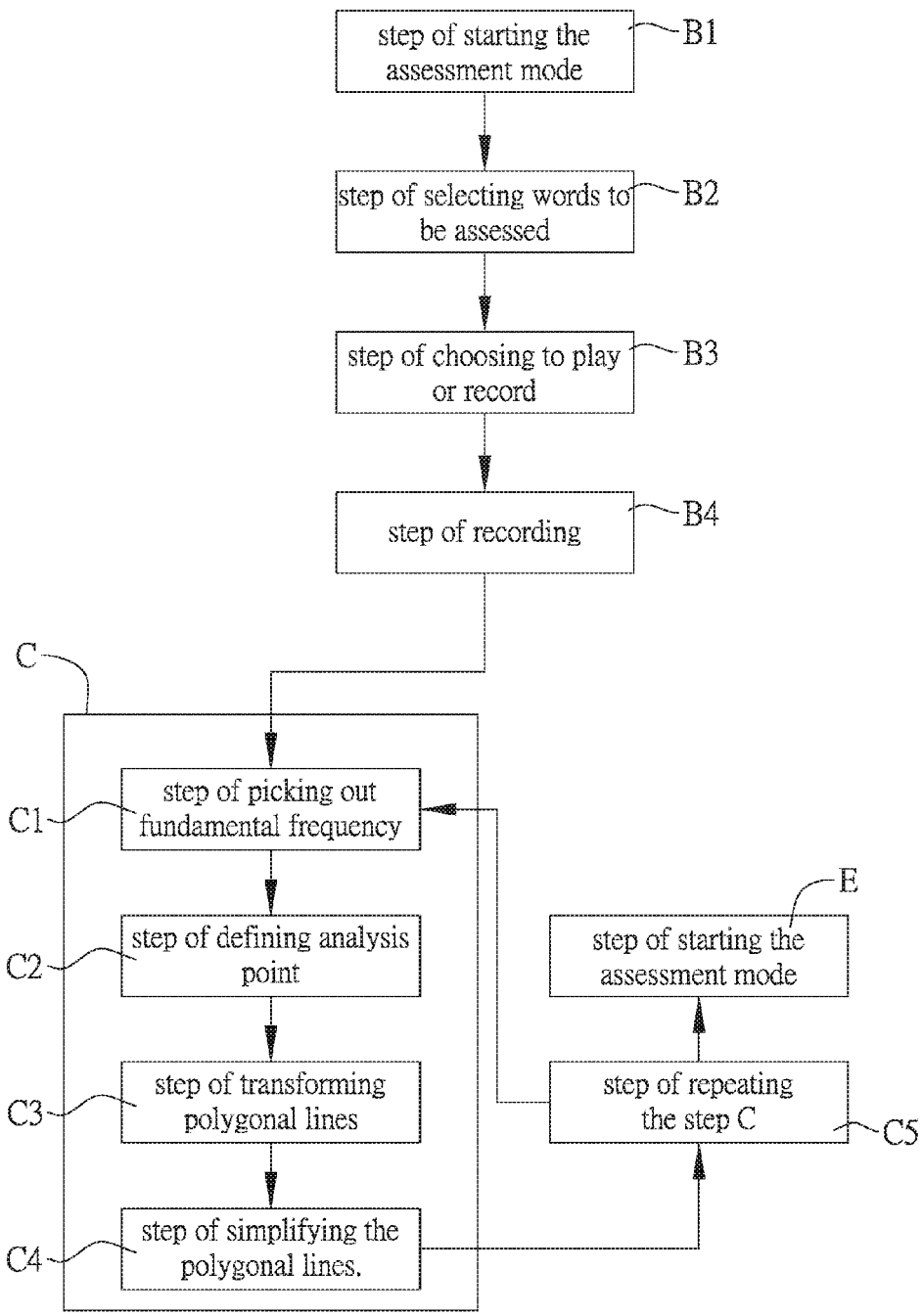
FIG. 3 is a flow chart a speech assessment method for a multisyllabic-word learning machine in accordance with a second preferred embodiment of the present invention.
Figure 4:
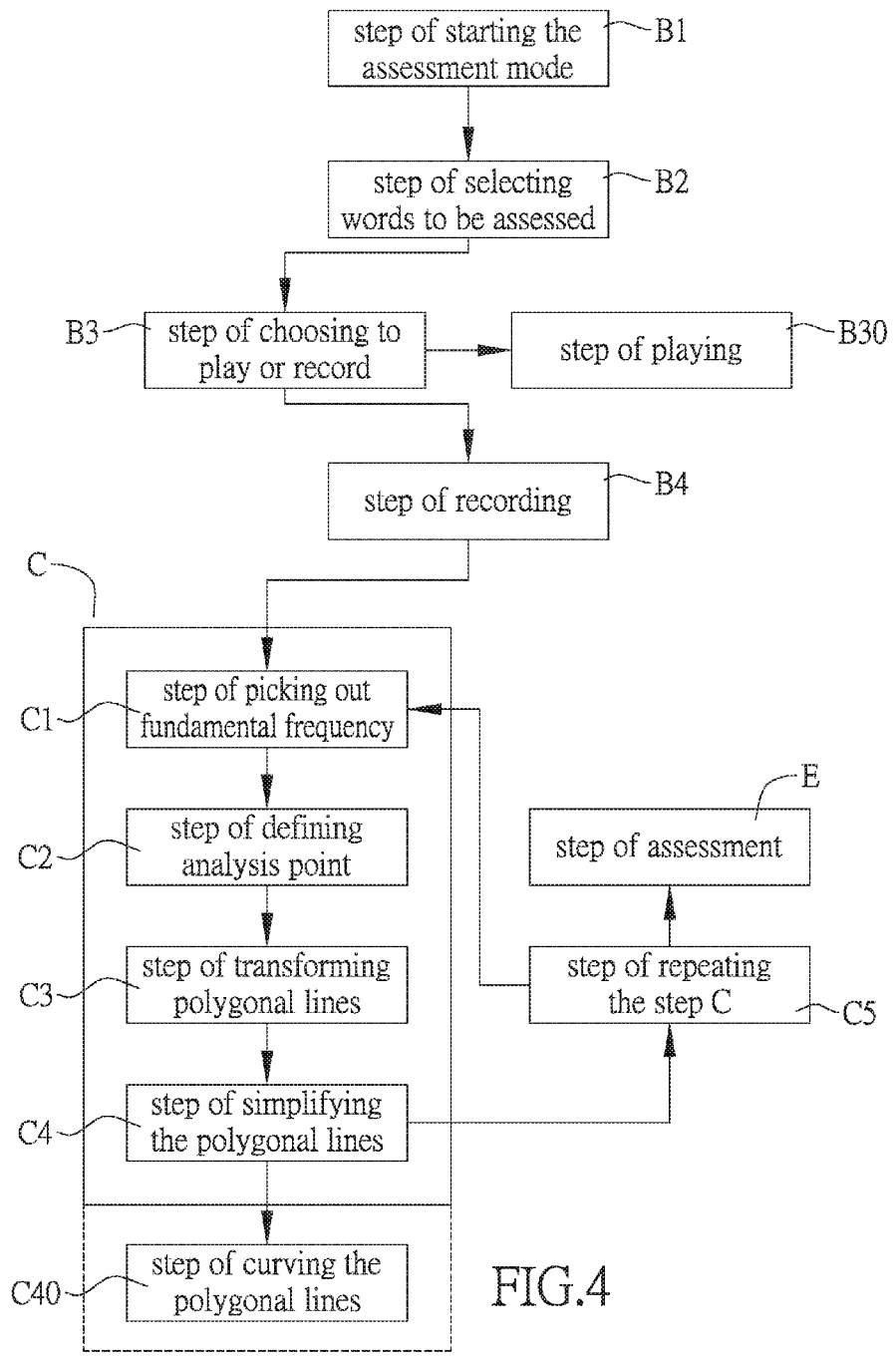
FIG. 4 is a flow chart a speech assessment method for a multisyllabic-word learning machine in accordance with a preferred embodiment of the present invention.

The assessment mode, (still multisyllabic words for example) as shown in FIGS. 3 and 4, comprises the following steps:

A step B1 of starting the assessment mode includes: using the central processing system 30 to let the displaying unit 33 displays the playing interface 31.

A step B2 of selecting words to be assessed includes: using the playing interface 31 to select the standard continuous audio files 12, 13 for multisyllabic words, or the standard audio files 120, 130 for each separate character of the multisyllabic words from the standard speech database 10.

A step B3 of choosing to play or record, as shown in FIG. 4, includes: choosing a step B30 of playing or a step B4 of recording. The step B4 of playing includes using the playing interface 31 to control the speech playing unit 20 to play the standard continuous audio files 12, 13 for multisyllabic words, or the standard audio files 120, 130 for each separate character of the multisyllabic words, so as to allow the learner to imitate the continuous speech played by the speech playing unit 20.

The step B4 of recording includes: using the speech receiving unit 40 to receive and convert the words to be assessed spoken by the learner into the learner's continuous audio files 52, 53 for multisyllabic words, and the learner's audio files 520, 530 for each separate character of the multisyllabic words, wherein the learner's continuous audio files 52, 53 and the learner's audio files 520, 530 are stored in the learner's speech database 50, and also transmitted to the audio visualization unit 32, to create the learner's monosyllabic reference polygonal line U1 for each separate character and the learner's continuous multisyllabic reference polygonal line U2 for multisyllabic words, by conducting a step C of visualization.

The step C of visualization includes: a step C1 of picking out fundamental frequency, a step C2 of defining analysis point, a step C3 of transforming polygonal lines, and a step C4 of simplifying the polygonal lines. The step C of visualization is capable of simultaneously converting standard audio file into the reference polygonal line S and converting the learner's audio file into the learner's polygonal line U. The following description is an example of converting the learner's audio file into the learner's polygonal line U, and more particularly converting the learner's audio file 520 for each separate character of the learner's continuous audio file 52 into the learner's monosyllabic reference polygonal line for bi-syllabic words 521 for each separate character of the bi-syllabic words, and then converting the learner's monosyllabic reference polygonal line for bi-syllabic words 521 into the learner's continuous bi-syllabic reference polygonal line 522.

Figure 5A:
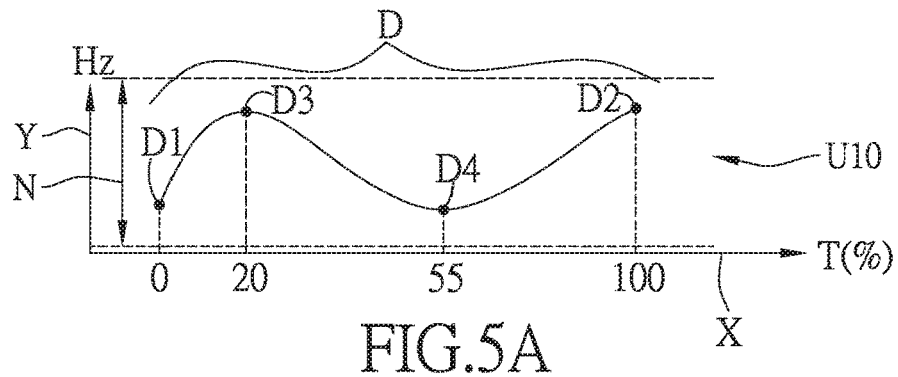
FIG. 5A is an illustrative view showing the learner's initial curve transforming process for the speech assessment method and a continuous audio visualization method of the present invention, wherein a step of picking out fundamental frequency and a step of defining analysis point are performed to pick the leaner's words, select the most stable section of the frequency of the words spoken by the learner, and pick out the fundamental frequency of the stable section, so as to form a learner's initial curve corresponding to the first character of the multisyllabic words spoken by the learner, and define that the learner's initial curve includes a plurality of analysis points.

The step C1 of picking out fundamental frequency, as shown in FIG. 5A, includes selecting the most stable section of the frequency of the words (namely, the learner's audio files 520, 530 for each separate character of the multisyllabic words) spoken by the learner, picking out the fundamental frequency of the stable section, and forming a learner's initial curve U10 corresponding to the first character of the multisyllabic words spoken by the learner. The horizontal and vertical axes of the graph of the learner's initial curve U10 are defined as a time axis X and a frequency axis Y, respectively. By such arrangements, the step C of visualization is performed character by character to form the learner's monosyllabic reference polygonal line for bi-syllabic words 521 of the learner's monosyllabic reference polygonal line U1 for each separate character.

The step C2 of defining analysis points, as shown in FIG. 5A, includes: defining that the learner's initial curve U10 includes a plurality of analysis points D, defining the one of the analysis points D at the beginning of the learner's initial curve U10 as a first analysis point D1, defining the one of the analysis points D at the end of the learner's initial curve U10 as a second analysis point D2, forming a tolerance band N by removing excessively high and low frequencies, picking out the highest and lowest analysis points D from the tolerance band N, and defining the highest and lowest analysis points D as a third analysis point D3 and a fourth analysis point D4, respectively.

Figure 5B:
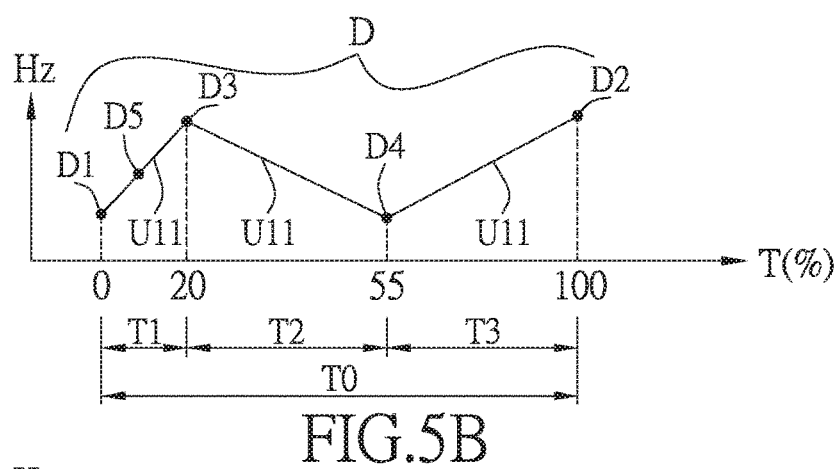
FIG. 5B is another illustrative view showing the learner's initial curve transforming process for the speech assessment method and a continuous audio visualization method of the present invention, wherein step of transforming polygonal lines is performed to connect four analysis points in sequence to form a polygonal line consisting of a plurality of mutually connected straight line segments, and each of the line segments is defined as an initial comparison syllable.
Figure 6A:
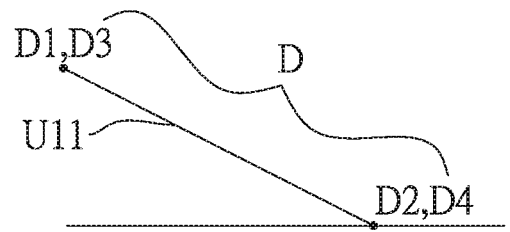
FIG. 6A shows the type of line that is likely to appear in the step C3.
Figure 6B:
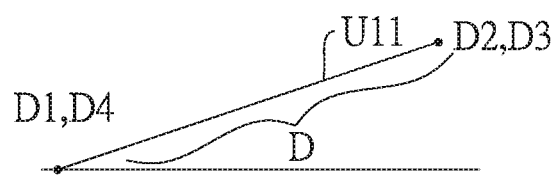
FIG. 6B shows the type of line that is likely to appear in the step C3.
Figure 6C:
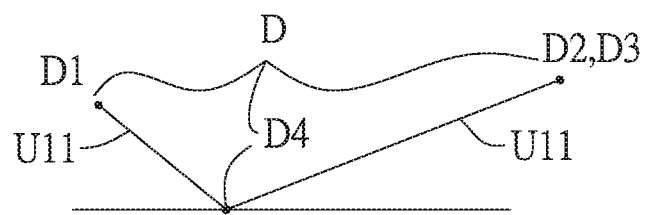
FIG. 6C shows the type of line that is likely to appear in the step C3.
Figure 6D:
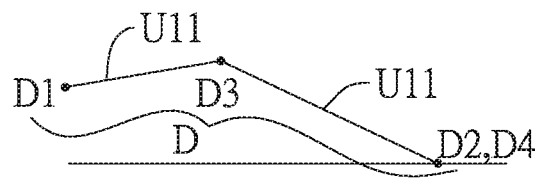
FIG. 6D shows the type of line that is likely to appear in the step C3.
Figure 6E:
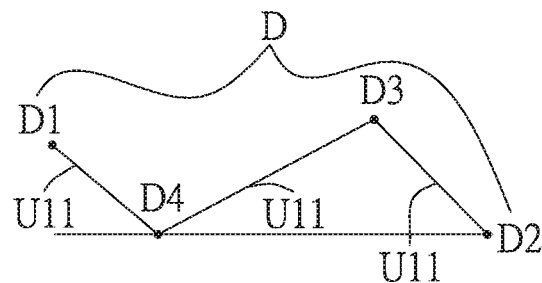
FIG. 6E shows the type of line that is likely to appear in the step C3.
Figure 6F:
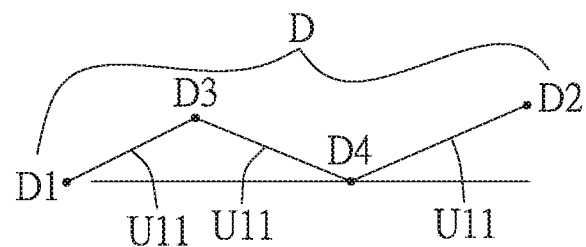
FIG. 6F shows the type of line that is likely to appear in the step C3.
Figure 7A:
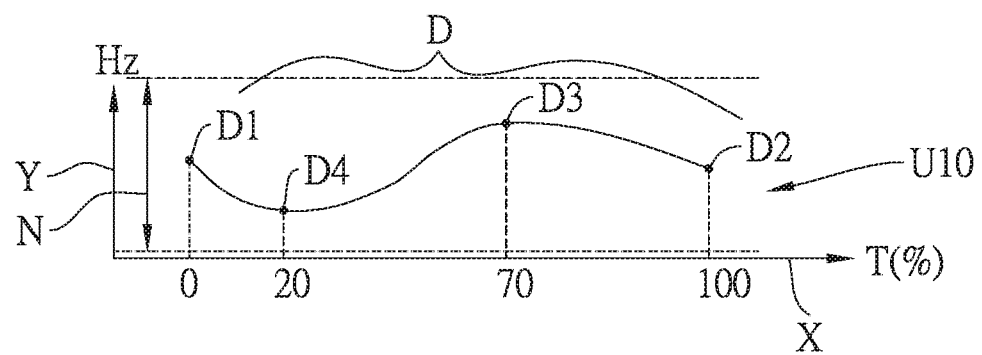
FIG. 7A is an illustrative view showing the learner's initial curve transforming process for the speech assessment method and a continuous audio visualization method of the present invention, wherein the steps of picking out fundamental frequency and defining analysis point are repeated to the rest characters to pick the leaner's words, select the most stable section of the frequency of the words spoken by the learner, and pick out the fundamental frequency of the stable section, so as to form a learner's initial curve corresponding to the first character of the multisyllabic words spoken by the learner, and define that the learner's initial curve includes a plurality of analysis points.
Figure 7B:
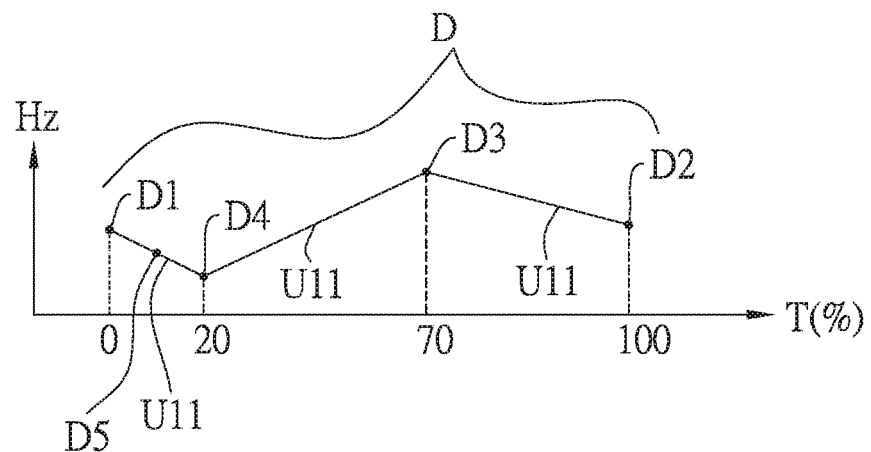
FIG. 7B is another illustrative view showing the learner's initial curve transforming process for the speech assessment method and a continuous audio visualization method of the present invention, wherein the step of transforming polygonal lines is repeated to the rest characters to connect four analysis points in sequence to form a polygonal line consisting of a plurality of mutually connected straight line segments, and each of the line segments is defined as an initial comparison syllable.
Figure 7C:
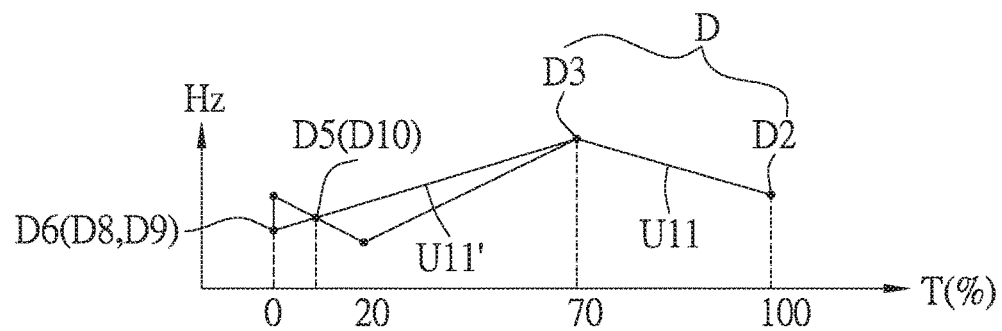
FIG. 7C is another illustrative view showing the learner's initial curve transforming process for the speech assessment method and a continuous audio visualization method of the present invention, wherein the step of simplifying the polygonal lines is repeated to the rest characters to combine unrepresentative initial comparison syllable and a neighboring second initial comparison syllable to form a new combined initial comparison syllable, then the combined initial comparison syllable is connected to another representative initial comparison syllable to form a learner's monosyllabic reference polygonal line for bi-syllabic words.
Figure 7D:
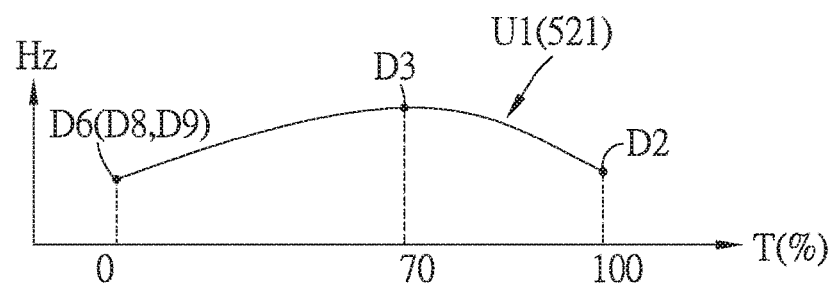
FIG. 7D is an illustrative view showing the learner's initial curve transforming process for the speech assessment method and a continuous audio visualization method of the present invention, the step of curving the polygonal lines is repeated to the rest characters to curve the learner's monosyllabic reference polygonal line for bi-syllabic words and the learner's monosyllabic reference polygonal line.

The step C3 of transforming polygonal lines, as shown in FIG. 5B, includes forming at least one section of line by connecting consequently connecting the four analysis points D to one another, defining the section of line as an initial comparison syllable U11, so that the learner's initial curve U10 which is in the shape of an arc presents a line which consists of the at least one section of straight line formed by the initial comparison syllables U11. FIGS. 6A-6F illustrate various types of lines that are likely to appear in the step C3. As shown in FIG. 6A, the first analysis point D1 and the third analysis point D3 are the same point, while the second analysis point D2 and the fourth analysis point D4 are the same point. As shown in FIG. 6B, the first analysis point D1 and the fourth analysis point D4 are the same point, while the second analysis point D2 and the third analysis point D3 are the same point, and the lines shown in FIGS. 6A and 6B are both a straight line consisted of a single initial comparison syllable U11. Or as shown in FIG. 6C, the line can be such that the second analysis point D2 (or the first analysis point D1 which is not shown) and the third analysis point D3 are the same point, or as shown in FIG. 6D, wherein the line can be such that the second analysis point D2 (or the first analysis point D1 which is not shown) and the fourth analysis point D4 are the same point, and the lines shown in FIGS. 6C and 6D are a line with just one turning point and consisted of two initial comparison syllables U11. Or as shown in FIGS. 6E and 6F, the line is a zigzag line with two turning points and consisted of three initial comparison syllables U11, wherein the four analysis points D are different and independent from one another.

Figure 5C:
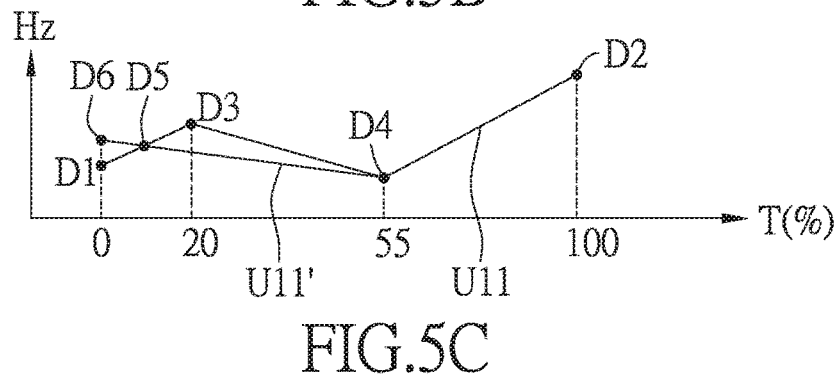
FIG. 5C is another illustrative view showing the learner's initial curve transforming process for the speech assessment method and a continuous audio visualization method of the present invention, wherein a step of simplifying the polygonal lines is performed to combine unrepresentative initial comparison syllable and a neighboring second initial comparison syllable to form a new combined initial comparison syllable, then the combined initial comparison syllable is connected to another representative initial comparison syllable to form a learner's monosyllabic reference polygonal line for bi-syllabic words.
Figure 5D:
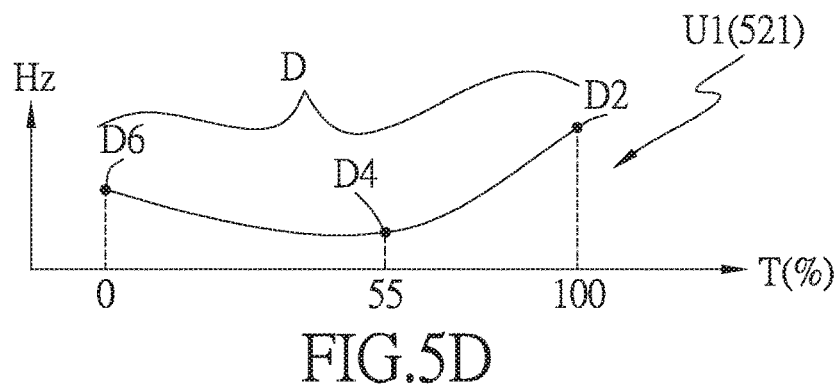
FIG. 5D is an illustrative view showing the learner's initial curve transforming process for the speech assessment method and a continuous audio visualization method of the present invention, the step of curving the polygonal lines is performed to curve the learner's monosyllabic reference polygonal line for bi-syllabic words and the learner's monosyllabic reference polygonal line.
Figures 1, 5C:
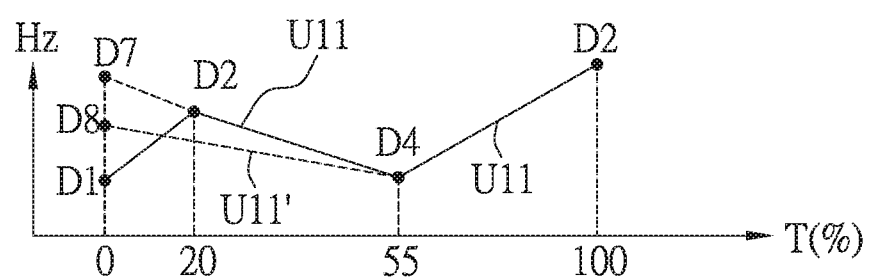
Figures 2, 5C:
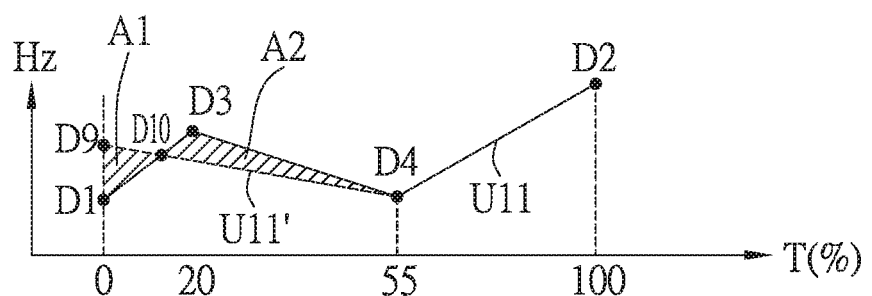

The step C4 of simplifying the polygonal lines, as shown in FIGS. 5B and 5C, includes comparing or checking the duration T1, T2 and T3 of the initial comparison syllables U11, and the total duration T0 of the learner's initial curve U10. If the duration T1 of the first initial comparison syllable U11 is found to be less than 30% of the total duration T0 of the learner's initial curve U10, the first initial comparison syllable U11 is considered as unrepresentative and then combined with a neighboring second initial comparison syllable U11 to form a combined initial comparison syllable U11', then the combined initial comparison syllable U11' is connected to another representative initial comparison syllable U11 to form a learner's monosyllabic reference polygonal line (which consists of straight line segments) for bi-syllabic words 521.

The abovementioned unrepresentative initial comparison syllables U11 can be combined into a new combined initial comparison syllable U11' with different methods. For example, a first combination method includes: selecting a modified fifth analysis point D5 at the center of the unrepresentative initial comparison syllable U11, as shown in FIG. 5C, connecting the to-be-combined analysis point D (which is the fourth analysis point D4, as shown in FIG. 5C) to the fifth analysis point D5, and extending to a position which is at the same point as the first analysis point D1 along the time axis to form a new sixth analysis point D6. The combined initial comparison syllable U11' as shown in FIG. 5C is formed by connecting the sixth analysis point D6 to the fourth analysis point D4.

The second combination method, as shown in FIG. 5C-1, includes: connecting the analysis points D of the unrepresentative initial comparison syllable U11 and the neighboring representative initial comparison syllable U11, and extending to a position which is at the same point as the analysis point D of the unrepresentative initial comparison syllable U11 along the time axis to form a new seventh analysis point D7; defining a new eighth analysis point D8 at the center between the first and seventh analysis points D1, D7, and forming a new combined initial comparison syllable U11' by connecting the eighth and fourth analysis points D8, D4.

The third combination method, as shown in FIG. 5C-2, includes: defining a ninth analysis point D9 which is at the same time point (along the time axis) as the analysis point D (which is the first analysis pint D1 in this embodiment) of the unrepresentative initial comparison syllable U11, forming a new combined initial comparison syllable U11' by connecting the ninth and fourth analysis points D9, D4, defining a tenth analysis point D10 at an intersection point of the unrepresentative initial comparison syllable U11 and the combined initial comparison syllable U11', wherein a first area A1 defined by the first, ninth and tenth analysis points D1, D9, D10 is equal to a second area A2 defined by the fourth, third and tenth analysis points D4, D3, D10.

Figure 8A:
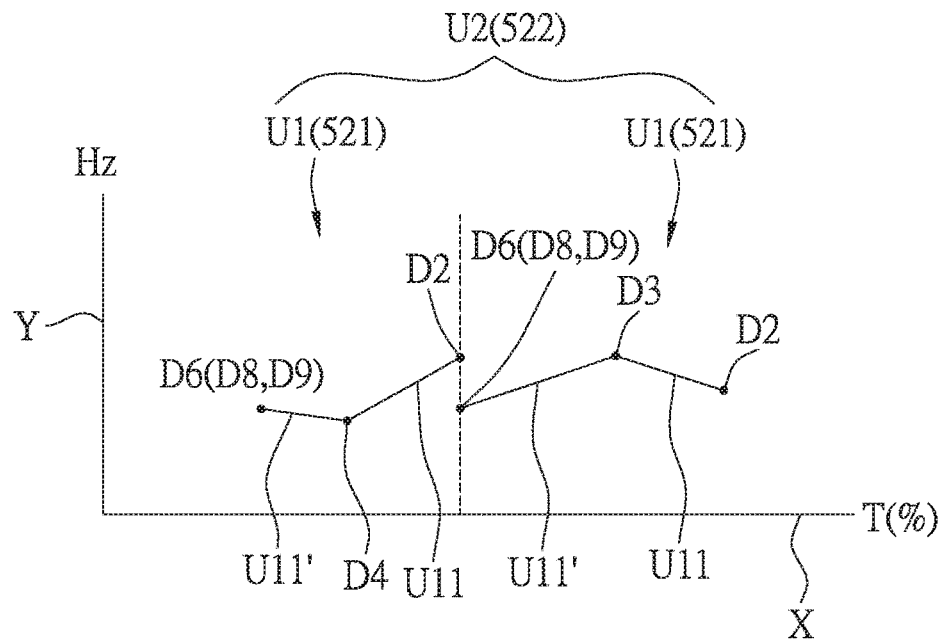
FIG. 8A is an illustrative view showing the process of combing the learner's monosyllabic polygonal lines for the speech assessment device of the preferred embodiment of the present invention, wherein the steps are repeated to convert the rest characters into the learner's monosyllabic reference polygonal line for bi-syllabic words of the learner's monosyllabic reference polygonal line, and connect the learner's monosyllabic reference polygonal lines to form the learner's continuous bi-syllabic reference polygonal line.
Figure 8B:
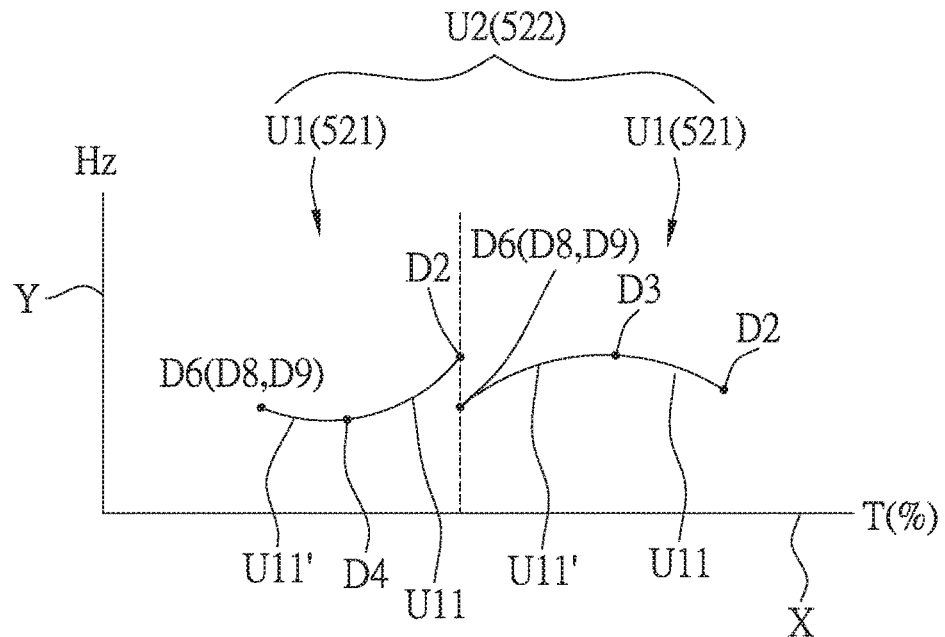
FIG. 8B is an illustrative view showing the process of curving the learner's monosyllabic polygonal lines for the speech assessment device of the preferred embodiment of the present invention, and showing the curves which are transformed from the learner's monosyllabic reference polygonal line for bi-syllabic words and the learner's monosyllabic reference polygonal line by the step of curving the polygonal lines.

A step C5 of repeating the step C of visualization C, as shown in FIGS. 7A-7D, includes: repeating the step C1 of picking out fundamental frequency, the step C2 of defining analysis point, the step C3 of transforming polygonal lines, and the step C4 of simplifying the polygonal lines, so as to convert the rest characters into the learner's monosyllabic reference polygonal line for bi-syllabic words 521 of the learner's monosyllabic reference polygonal line U1, and connect the learner's monosyllabic reference polygonal lines U1 to form the learner's continuous bi-syllabic reference polygonal line 522 which is to be displayed on the displaying unit 33, as shown in FIG. 8A, for the learner to read and assess.

In a preferred embodiment, a step C40 of curving the polygonal lines can be performed after the step C of simplifying the polygonal lines to curve the learner's monosyllabic reference polygonal line U1 and the monosyllabic reference polygonal line S1, as shown in FIG. 4, includes curving the learner's monosyllabic reference polygonal line for bi-syllabic words 521 into a curved learner's monosyllabic reference curve, as shown in FIGS. 5D, 7D, 9 and 10, curving the polygonal line into a function in the form of a curve is of prior art and not the key point of the present invention, and therefore no further description would be required.

Figure 9:
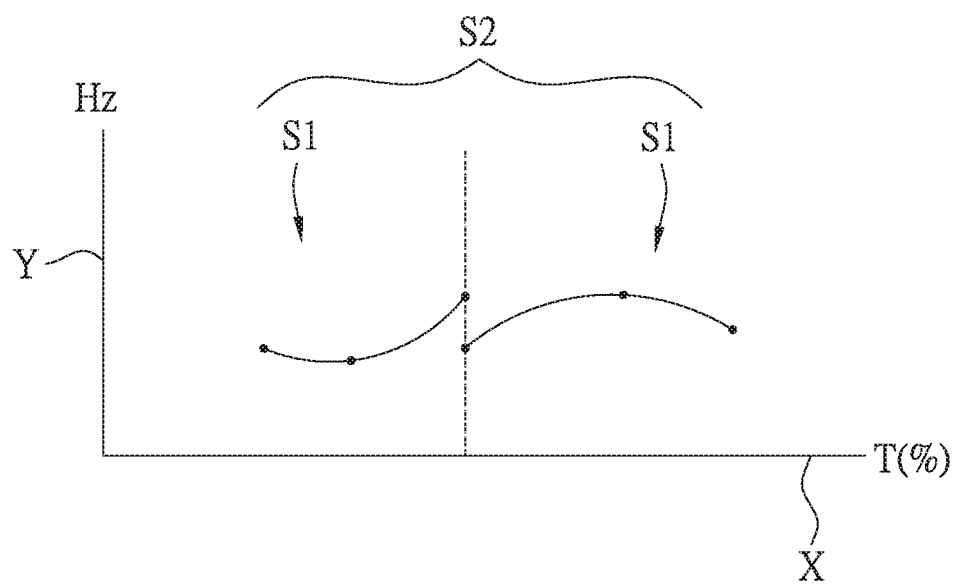
FIG. 9 is an illustrative view showing the curved continuous multisyllabic reference polygonal line for the speech assessment device of the preferred embodiment of the present invention.
Figure 10:
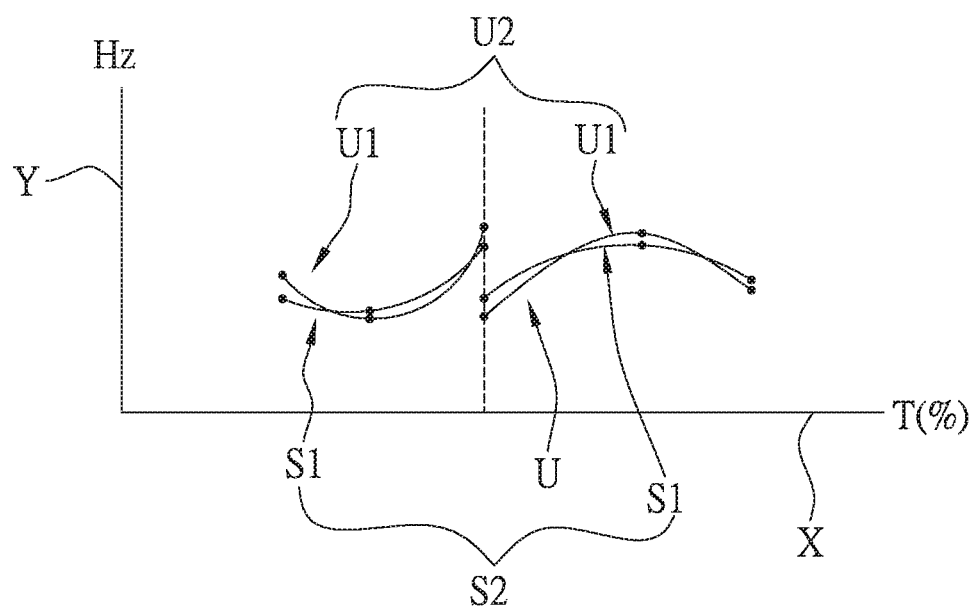
FIG. 10 is an illustrative view showing the comparison between the curved continuous multisyllabic reference polygonal line and the curved learner's continuous multisyllabic reference polygonal line for the speech assessment device of the preferred embodiment of the present invention.

A step E of assessment includes picking up the monosyllabic reference polygonal line S1 for each separate character, and the continuous multisyllabic reference polygonal line S2 for multisyllabic words, as shown in FIG. 9, and comparing them with the learner's monosyllabic reference polygonal line U1 and the learner's continuous bi-syllabic reference polygonal line U2, as shown in FIG. 10, to form a plurality of comparison parameters. The first comparison parameter is to compare the slope directions of the respective syllables of the monosyllabic reference polygonal line S1, and the initial comparison syllable U11 and the combined initial comparison syllable U11' of the learner's monosyllabic reference polygonal line U1, the learner's speech is considered as qualified if the slop directions are the same. The second comparison parameter is to compare the slope deviation between the respective syllables of the monosyllabic reference polygonal line S1, and the syllable of the learner's monosyllabic reference polygonal line U1, and the learner's speech is considered as qualified if the slop deviation is within a predetermined range. For example, the range of the slope deviation can be +−15 degrees, and the qualified range can also be 10% of the slope deviation, which is used to train the learner on the accuracy of the pitch change of the words. The third comparison parameter is to compare the position deviation along the time axis X between the respective analysis points D of the monosyllabic reference polygonal line S1 and the analysis points D of the learner's monosyllabic reference polygonal line U1, and the learner's speech is considered as qualified if the position deviation is smaller than a predetermined range. For example, the qualified range can be +−10%, and this part is used to train the learner on the accuracy of the pitch change of the words. The fourth comparison parameter is to compare the length deviation along the time axis X between the respective syllables of the monosyllabic reference polygonal line S1 and the learner's monosyllabic reference polygonal line U1, and the learner's speech is considered as qualified if the length deviation is smaller than a predetermined range. For example, the qualified range can be +−10%, and this part is used to train the learner on the use of pause in speech. The fifth comparison parameter is to compare the numbers of syllables of the respective syllables of the monosyllabic reference polygonal line S1 and the learner's monosyllabic reference polygonal line U1, and the learner's speech is considered as qualified if the numbers of syllables are equal. There can be more comparison parameters in the assessment step E, and the step E of assessment can include one or more comparison parameters. For example, the first and fifth comparison parameters account for 60%, the second parameter accounts for 10%, the third parameter accounts for 10%, and the fourth parameter accounts for 10%.

By performing the step B1 of starting the assessment mode, the step B2 of selecting words to be assessed, the step B3 of choosing to play or record, the step B4 of recording, the step C of visualization (including the step C1 of picking out fundamental frequency, the step C2 of defining analysis point, the step C3 of transforming polygonal lines, and the step C4 of simplifying the polygonal lines), the step C5 of repeating the step C, and the step E of assessment, the speech assessment device and method for a multisyllabic-word learning machine of the preferred embodiment of the present invention is capable of providing assistance in oral language learning, and capable of rehabilitating patients with hearing impairment through visual aids.

While we have shown and described various embodiments in accordance with the present invention, it is clear to those skilled in the art that further embodiments may be made without departing from the scope of the present invention.

What is claimed is:

1. A speech assessment device for a multisyllabic-word learning machine, comprising:
    a standard speech database including at least one standard audio file for characters or words, and a reference polygonal line corresponding to the standard audio file for characters or words, the standard audio file for characters or words including a standard continuous audio file for multisyllabic words, wherein the standard continuous audio file for multisyllabic words includes a standard continuous audio file in which each of the multisyllabic words is spoken continuously without pause, and a standard audio file in which the multisyllabic words is spoken character by character with pauses between saying isolated characters, the standard continuous audio file for multisyllabic words includes a monosyllabic reference polygonal line for each separate character, and the monosyllabic reference polygonal lines for each separate character are combined into a continuous multisyllabic reference polygonal line for multisyllabic words;
    a speech playing unit serving to play the standard audio files for the words stored in the standard speech database;
    a central processing system including a central processing unit which is connected to the standard speech database and the speech playing unit, the central processing unit being signal connected to a playing interface, an audio visualization unit, and a displaying unit, the central processing unit being further connected to a speech receiving unit, a learner's speech database, and an assessment unit, wherein the central processing unit makes comparison and assessment of the standard speech database through the assessment unit, the playing interface allows a user to select pronunciation or audio files for words from the standard speech database or the learner's speech database, and then the playing interface controls the speech playing unit to play the selected audio files, the audio visualization unit converts the audio files for words spoken by a learner into a learner's polygonal line, while controlling the speech playing unit to play the selected audio files from the standard speech database or the learner's speech database, the playing interface also shows the corresponding reference polygonal line and the learner's polygonal line from the standard speech database or the learner's speech database, simultaneously;
    the speech receiving unit serving to receive speech spoken by the user or learner, and the received speech becomes the learner's audio file in the learner's speech database, wherein the received speech is transmitted to and converted by the audio visualization unit into the learner's polygonal line; and
    the learner's speech database including at least one learner's audio file and a learner's polygonal line corresponding to the learner's audio file, the learner's audio file including a learner's continuous audio file for multisyllabic words, wherein the learner's continuous audio file for multisyllabic words includes a learner's continuous audio file in which each of the multisyllabic words is spoken by the learner continuously without pause, and a learner's audio file in which the multisyllabic words is spoken by the learner character by character with pauses between saying isolated characters, the learner's continuous audio file for multisyllabic words includes a learner's monosyllabic reference polygonal line for each separate character, and the learner's monosyllabic reference polygonal lines for each separate character are combined into a learner's continuous multisyllabic reference polygonal line for multisyllabic words;
    the assessment unit being signal connected to the central processing system, and conducts assessment by checking the slope, turning time and slope deviation of the reference polygonal line and the learner's polygonal line;
    wherein the user uses the playing interface of the central processing system to select standard audio files for words to be learned, the speech playing unit plays the standard audio files for words to be learned, then the displaying unit displays a corresponding reference polygonal line, then the audio visualization unit converts the audio files for words spoken by the learner and received by the speech receiving unit into the learner's polygonal line, then the assessment unit conducts assessment by comparing the learner's polygonal line with the reference polygonal line, and produces an assessment result which is to be displayed on the displaying unit.

2. The speech assessment device for the multisyllabic-word learning machine as claimed in claim 1, wherein the standard audio file for characters or words includes a standard audio file for monosyllabic words, a standard continuous audio file for bi-syllabic words, a standard continuous audio file for multisyllabic words, a standard audio file for each separate character of the bi-syllabic words, and a standard audio file for each separate character of the multisyllabic words, each of the standard continuous audio file for bi-syllabic words, the standard continuous audio file for multisyllabic words, the standard audio file for each separate character of the bi-syllabic words, and the standard audio file for each separate character of the multisyllabic words is a standard continuous audio file for multisyllabic words, the monosyllabic reference polygonal line for each separate character includes a monosyllabic reference polygonal line for each separate character of the bi-syllabic words, and a monosyllabic reference polygonal line for each separate character of the multisyllabic words, the continuous multisyllabic reference polygonal line for multisyllabic words includes a continuous bi-syllabic reference polygonal line for bi-syllabic words and a continuous multisyllabic reference polygonal line for multisyllabic words.

3. The speech assessment device for the multisyllabic-word learning machine as claimed in claim 1, wherein the learner's audio file includes a learner's audio file for monosyllabic words, a learner's continuous audio file for bi-syllabic words, a learner's continuous audio file for multi-syllabic words, a learner's audio file for each separate character of the bi-syllabic words, and a learner's audio file for each separate character of the multisyllabic words;

each of the learner's continuous audio file for bi-syllabic words, and the learner's continuous audio file for multisyllabic words, the learner's audio file for each separate character of the bi-syllabic words, and the learner's audio file for each separate character of the multisyllabic words is the learner's continuous audio file for multisyllabic words, the learner's monosyllabic reference polygonal line for each separate character includes a learner's monosyllabic reference polygonal line for bi-syllabic words for each separate character of the multisyllabic words, and a learner's monosyllabic reference polygonal line for each separate character of the multisyllabic words, and the learner's continuous multisyllabic reference polygonal line for multisyllabic words includes a learner's continuous bi-syllabic reference polygonal line and a learner's continuous multisyllabic reference polygonal line.

4. A speech assessment method for using the speech assessment device for the multisyllabic-word learning machine as claimed in claim 2, comprising the following steps:

a step of starting a learning mode including using the central processing system to let the displaying unit displays the playing interface;

a step of selecting words to be learned including using the playing interface to select the standard continuous audio files for multisyllabic words, or the standard audio files for each separate character of the multisyllabic words from the standard speech database; and a step of playing including using the playing interface to control the speech playing unit to play the standard continuous audio files for multisyllabic words, or the standard audio files for each separate character of the multisyllabic words.

5. A speech assessment method for using the speech assessment device for the multisyllabic-word learning machine as claimed in claim 1, comprising the following steps:

a step of starting the assessment mode including using the central processing system to let the displaying unit displays the playing interface;

a step of selecting words to be assessed including using the playing interface to select the standard continuous audio files for multisyllabic words, or the standard audio files for each separate character of the multisyllabic words from the standard speech database;

a step of choosing to play or record including choosing a step of playing or a step of recording;

a step of recording including using the speech receiving unit to receive and convert the words to be assessed spoken by the learner into the learner's continuous audio files for multisyllabic words, and the learner's audio files for each separate character of the multisyllabic words, wherein the learner's continuous audio files, and the learner's audio files are stored in the learner's speech database, and also transmitted to the audio visualization unit to create the learner's monosyllabic reference polygonal line for each separate character and the learner's continuous multisyllabic reference polygonal line for multisyllabic words, by conducting a step of visualization;

the step of visualization including: a step of picking out fundamental frequency, a step of defining analysis point, a step of transforming polygonal lines, and a step of simplifying the polygonal lines, wherein the step of visualization is capable of simultaneously converting standard audio file into the reference polygonal line and converting the learner's audio file into the learner's polygonal line;

the step of picking out fundamental frequency including selecting the most stable section of the frequency of the words spoken by the learner, picking out the fundamental frequency of the stable section, and forming a learner's initial curve corresponding to the first character of the multisyllabic words spoken by the learner, wherein the horizontal and vertical axes of the graph of the learner's initial curve are defined as a time axis and a frequency axis, respectively, the step of visualization is performed character by character to form the learner's monosyllabic reference polygonal line of the learner's monosyllabic reference polygonal line for each separate character;

the step of defining analysis points including defining that the learner's initial curve includes a plurality of analysis points;

the step of transforming polygonal lines including forming at least one section of line by connecting consequently connecting the four analysis points to one another, defining the section of line as an initial comparison syllable, so that the learner's initial curve presents a line which consists of the at least one section of straight line formed by the initial comparison syllables;

the step of simplifying the polygonal lines including comparing or checking the durations of the initial comparison syllables, and the total duration of the learner's initial curve, if the duration of the first initial comparison syllable is found to be less than 30% of the total duration of the learner's initial curve, the first initial comparison syllable is considered as unrepresentative and then combined with a neighboring second initial comparison syllable to form a combined initial comparison syllable, then the combined initial comparison syllable is connected to another representative initial comparison to form a learner's monosyllabic reference polygonal line for bi-syllabic words;

a step of repeating including: repeating the step of picking out fundamental frequency, the step of defining analysis point, the step of transforming polygonal lines, and the step of simplifying the polygonal lines, so as to convert the rest characters into the learner's monosyllabic reference polygonal line for bi-syllabic words of the learner's monosyllabic reference polygonal line, and connect the learner's monosyllabic reference polygonal line to form the learner's continuous bi-syllabic reference polygonal line which is to be displayed on the displaying unit;

a step of assessment including picking up the monosyllabic reference polygonal line for each separate character, and the continuous multisyllabic reference polygonal line for multisyllabic words, and comparing them with the learner's monosyllabic reference and the learner's continuous bi-syllabic reference to form a plurality of comparison parameters, and the step of assessment include one or more comparison parameters.

6. The speech assessment method as claimed in claim 5, wherein the step of playing step of the step of choosing to play or record includes using the playing interface to control the speech playing unit to play the standard continuous audio files for multisyllabic words, or the standard audio files for each separate character of the multisyllabic words, so as to allow the learner to imitate the continuous speech played by the speech playing unit.

7. The speech assessment method as claimed in claim 5, wherein the step of defining analysis points includes: defining the one of the analysis points at the beginning of the learner's initial curve as a first analysis point, defining the one of the analysis points at the end of the learner's initial curve as a second analysis point, forming a tolerance band by removing excessively high and low frequencies, picking out the highest and lowest analysis points from the tolerance band, and defining the highest and lowest analysis points as a third analysis point and a fourth analysis point, respectively.

8. The speech assessment method as claimed in claim 5, wherein in the step of transforming polygonal lines, the polygonal lines include a first line, a second line, a third line, a fourth line and a fifth line;

a first analysis point and a third analysis point of the first line are the same point, while the line a second analysis point and a fourth analysis point of the first line are the same point, a first analysis point and a fourth analysis point of the second line are the same point, while a second analysis point and a third analysis point of the second line are the same point, both the first and second lines are a straight line consisted of a single initial comparison;

a second analysis point and a third analysis point of the third line are the same point, a second analysis point and a fourth analysis point of the fourth line are the same point, both the third and fourth lines are a line with one turning point and consisted of two initial comparison syllables;

the fifth line is a zigzag line with two turning points and consisted of three initial comparison syllables, and four analysis points of the fifth line are different and independent from one another.

9. The speech assessment method as claimed in claim 5, wherein the unrepresentative initial comparison syllables in the step of simplifying the polygonal lines are combined into a combined initial comparison syllable by performing the following steps: selecting a modified fifth analysis point at the center of the unrepresentative initial comparison, connecting the to-be-combined analysis point to the fifth analysis point, and extending to a position which is at the same point as the first analysis point along the time axis to form a sixth analysis point.

10. The speech assessment method as claimed in claim 5, wherein the unrepresentative initial comparison syllables in the step of simplifying the polygonal lines are combined into a combined initial comparison syllable by performing the following steps: connecting the analysis points of the unrepresentative initial comparison and the neighboring representative initial comparison, and extending to a position which is at the same point as the analysis point of the unrepresentative initial comparison along the time axis to form a seventh analysis point; defining an eighth analysis point at the center between the first and seventh analysis points, and forming a combined initial comparison syllable by connecting the eighth and fourth analysis points.

11. The speech assessment method as claimed in claim 5, wherein the unrepresentative initial comparison syllables in the step of simplifying the polygonal lines are combined into a combined initial comparison syllable by performing the following steps: connecting the analysis points of the unrepresentative initial comparison and the neighboring representative initial comparison, and extending to a position which is at the same point as the analysis point of the unrepresentative initial comparison along the time axis to form a seventh analysis point; defining an eighth analysis point at the center between the first and seventh analysis points, and forming a combined initial comparison syllable by connecting the eighth and fourth analysis points.

12. The speech assessment method as claimed in claim 5 further comprising a step of curving the polygonal lines, the step of curving the polygonal lines is performed after the step of simplifying the polygonal lines, and includes curving the learner's monosyllabic reference polygonal line into curves.

13. The speech assessment method as claimed in claim 5, wherein the step of assessment include a first comparison parameter, a second comparison parameter, a third comparison parameter, a fourth comparison parameter and a fifth comparison parameter, the first comparison parameter is to compare the slope directions of the respective syllables of the monosyllabic reference polygonal line, and the initial comparison and the combined initial comparison syllable of the learner's monosyllabic reference, the learner's speech is considered as qualified if the slop directions are the same;

the second comparison parameter is to compare the slope deviation between the respective syllables of the monosyllabic reference polygonal line curve, and the syllable of the learner's monosyllabic reference, and the learner's speech is considered as qualified if the slop deviation is within a predetermined range, the range of the slope deviation is +−15 degrees, and the qualified range is +−10% of the slope deviation, the third comparison parameter is to compare the position deviation along the time axis between the respective analysis points of the monosyllabic reference polygonal line and the analysis points of the learner's monosyllabic reference, and the learner's speech is considered as qualified if the position deviation is smaller than +−40%;

the fourth comparison parameter is to compare the length deviation along the time axis between the respective syllables of the monosyllabic reference polygonal line and the learner's monosyllabic reference, and the learner's speech is considered as qualified if the length deviation is smaller than +−10%;

the fifth comparison parameter is to compare the numbers of syllables of the respective syllables of the monosyllabic reference polygonal line and the learner's monosyllabic reference, and the learner's speech is considered as qualified if the numbers of syllables are equal.

14. A speech assessment method for using the speech assessment device for the multisyllabic-word learning machine as claimed in claim 1 to visualize a continuous audio, comprising the following steps:

a step of picking out fundamental frequency including selecting the most stable section of the frequency of the words spoken by the learner, picking out the fundamental frequency of the stable section, and forming a learner's initial curve corresponding to the first character of the multisyllabic words spoken by the learner, wherein the horizontal and vertical axes of the graph of the learner's initial curve are defined as a time axis and a frequency axis, respectively, the step of visualization is performed character by character to form the learner's monosyllabic reference polygonal line of the learner's monosyllabic reference polygonal line for each separate character;

a step of defining analysis points including defining that the learner's initial curve includes a plurality of analysis points;

a step of transforming polygonal lines including forming at least one section of line by connecting consequently connecting the four analysis points to one another, defining the section of line as an initial comparison, so that the learner's initial curve presents a line which consists of the at least one section of straight line formed by the initial comparison syllables;

a step of simplifying the polygonal lines including comparing or checking the durations of the initial comparison syllables, and the total duration of the learner's initial curve, if the duration of the first initial comparison is found to be less than 30% of the total duration of the learner's initial curve, the first initial comparison is considered as unrepresentative and then combined with a neighboring second initial comparison to form a combined initial comparison syllable, then the combined initial comparison syllable is connected to another representative initial comparison to form a learner's monosyllabic reference polygonal line for bi-syllabic words; and a step of repeating including: repeating the step of picking out fundamental frequency, the step of defining analysis point, the step of transforming polygonal lines, and the step of simplifying the polygonal lines, so as to convert the rest characters into the learner's monosyllabic reference polygonal line for bi-syllabic words of the learner's monosyllabic reference polygonal lines, and connect the learner's monosyllabic reference polygonal line to form the learner's continuous bi-syllabic reference polygonal line which is to be displayed on the displaying unit.

15. The speech assessment method as claimed in claim 14, wherein the step of defining analysis points includes: defining the one of the analysis points at the beginning of the learner's initial curve as a first analysis point, defining the one of the analysis points at the end of the learner's initial curve as a second analysis point, forming a tolerance band by removing excessively high and low frequencies, picking out the highest and lowest analysis points from the tolerance band, and defining the highest and lowest analysis points as a third analysis point and a fourth analysis point, respectively.

16. The speech assessment method as claimed in claim 15, wherein in the step of transforming polygonal lines, the polygonal lines include a first line, a second line, a third line, a fourth line and a fifth line;

a first analysis point and a third analysis point of the first line are the same point, while the line a second analysis point and a fourth analysis point of the first line are the same point, a first analysis point and a fourth analysis point of the second line are the same point, while a second analysis point and a third analysis point of the second line are the same point, both the first and second lines are a straight line consisted of a single initial comparison;

a second analysis point and a third analysis point of the third line are the same point, a second analysis point and a fourth analysis point of the fourth line are the same point, both the third and fourth lines are a line with one turning point and consisted of two initial comparison syllables;

the fifth line is a zigzag line with two turning points and consisted of three initial comparison syllables, and four analysis points of the fifth line are different and independent from one another.

17. The speech assessment method as claimed in claim 14, wherein the unrepresentative initial comparison syllables in the step of simplifying the polygonal lines are combined into a combined initial comparison syllable by performing the following steps: selecting a modified fifth analysis point at the center of the unrepresentative initial comparison, connecting the to-be-combined analysis point to the fifth analysis point, and extending to a position which is at the same point as the first analysis point along the time axis to form a sixth analysis point.

18. The speech assessment method as claimed in claim 14, wherein the unrepresentative initial comparison syllables in the step of simplifying the polygonal lines are combined into a combined initial comparison syllable by performing the following steps: connecting the analysis points of the unrepresentative initial comparison and the neighboring representative initial comparison, and extending to a position which is at the same point as the analysis point of the unrepresentative initial comparison along the time axis to form a seventh analysis point; defining an eighth analysis point at the center between the first and seventh analysis points, and forming a combined initial comparison syllable by connecting the eighth and fourth analysis points.

19. The speech assessment method as claimed in claim 14, wherein the unrepresentative initial comparison syllables in the step of simplifying the polygonal lines are combined into a combined initial comparison syllable by performing the following steps: connecting the analysis points of the unrepresentative initial comparison and the neighboring representative initial comparison, and extending to a position which is at the same point as the analysis point of the unrepresentative initial comparison along the time axis to form a seventh analysis point; defining an eighth analysis point at the center between the first and seventh analysis points, and forming a combined initial comparison syllable by connecting the eighth and fourth analysis points.

20. The speech assessment method as claimed in claim 14 further comprising a step of curving the polygonal lines, the step of curving the polygonal lines is performed after the step of simplifying the polygonal lines, and includes curving the learner's monosyllabic reference polygonal lines into curves.

\* \* \* \* \*

UNITED STATES PATENT AND TRADEMARK OFFICE
CERTIFICATE OF CORRECTION

PATENT NO. : 10,109,217 B2  
APPLICATION NO. : 15/081925  
DATED : October 23, 2018  
INVENTOR(S) : Ya-Mei Tseng Page 1 of 1

It is certified that error appears in the above-identified patent and that said Letters Patent is hereby corrected as shown below:

On the Title Page

Item (73) the Assignees should be changed to Ya-Mei Tseng (TW); CAPICLOUD TECHNOLOGY LIMITED (TW)

Signed and Sealed this  
Eighth Day of January, 2019

Andrei Iancu  
*Director of the United States Patent and Trademark Office*